(12) United States Patent
Tomizawa et al.

(10) Patent No.: US 9,537,367 B2
(45) Date of Patent: Jan. 3, 2017

(54) DRIVING DEVICE

(71) Applicant: DENSO CORPORATION, Kariya, Aichi-pref. (JP)

(72) Inventors: Hiroki Tomizawa, Chiryu (JP); Makoto Taniguchi, Obu (JP)

(73) Assignee: DENSO CORPORATION, Kariya (JP)

( * ) Notice: Subject to any disclaimer, the term of this patent is extended or adjusted under 35 U.S.C. 154(b) by 352 days.

(21) Appl. No.: 14/278,280

(22) Filed: May 15, 2014

(65) Prior Publication Data

US 2014/0339966 A1 Nov. 20, 2014

(30) Foreign Application Priority Data

May 17, 2013 (JP) .................. 2013-104925

(51) Int. Cl.
*H02K 5/22* (2006.01)

(52) U.S. Cl.
CPC ................. *H02K 5/22* (2013.01); *H02K 11/33* (2016.01)

(58) Field of Classification Search
CPC .................................. H02K 5/22; H02K 11/33
USPC .................. 310/67 D, 68 B, 156.53
See application file for complete search history.

(56) References Cited

U.S. PATENT DOCUMENTS

| 2004/0017123 | A1* | 1/2004 | Miyashita | H02K 21/14 310/156.53 |
| 2011/0187242 | A1* | 8/2011 | Takeuchi | H02K 21/02 310/68 B |
| 2011/0254387 | A1 | 10/2011 | Matsuda et al. | |
| 2012/0161590 | A1 | 6/2012 | Yamasaki et al. | |
| 2012/0200202 | A1* | 8/2012 | Asai | H02K 11/0031 310/68 B |
| 2012/0286604 | A1* | 11/2012 | Abe | H02K 5/225 310/71 |
| 2013/0187517 | A1 | 7/2013 | Asao et al. | |
| 2013/0249356 | A1 | 9/2013 | Nakano et al. | |

FOREIGN PATENT DOCUMENTS

| JP | 9-327139 | 12/1997 |
| JP | 2010-28925 | 2/2010 |
| JP | 2012-90496 | 5/2012 |

OTHER PUBLICATIONS

Office Action (2 pages) dated Feb. 17, 2015, issued in corresponding Japanese Application No. 2013-104925 and English translation (3 pages).

* cited by examiner

*Primary Examiner* — Terrance Kenerly
(74) *Attorney, Agent, or Firm* — Nixon & Vanderhye PC

(57) ABSTRACT

A motor casing of a driving device has a cylindrical wall portion, a bottom wall portion and a bearing holding portion formed in the bottom wall portion. An electric motor has a stator, a shaft and a rotor. A motor control unit controls operation of the electric motor. A first frame, to which the motor control unit is fixed, is provided between the motor control unit and the bottom wall portion of the motor casing. A first contacting portion is formed in the bottom wall portion and projected toward the first frame. The first contacting portion is in contact with the first frame at a front-side surface of the first contacting portion. A contacting surface area between the motor casing and the first frame is limitedly reduced, to thereby reduce noise caused by vibration. In addition, since a sufficient surface pressure can be obtained, strength of the driving device in its axial direction is increased.

19 Claims, 11 Drawing Sheets

DRIVING DEVICE

CROSS REFERENCE TO RELATED APPLICATION

This application is based on Japanese Patent Application No. 2013-104925 filed on May 17, 2013, the disclosure of which is incorporated herein by reference.

FIELD OF TECHNOLOGY

The present disclosure relates to a driving device, in particular, relates to a motor driving device used for an electric power steering apparatus for an automotive vehicle.

BACKGROUND

An electric motor is known in the art, according to which a motor control unit is coaxially arranged with the electric motor. In an electric motor, for example, as disclosed in Japanese Patent Publication No. 2010-028925, a motor control unit is attached to a cover member, which is fitted to fitting portions formed on a motor housing so as to coaxially arrange the motor control unit with the electric motor.

In the above prior art (JP 2010-028925), the motor control unit is arranged in the cover member fitted to the motor housing in a faucet joint structure. An axial position of the cover member is positioned by a flanged portion, which is made of a thin metal plate and formed at the motor housing. According to the above structure, mechanical strength in the axial direction of the electric motor is not large.

In a case that the cover member or another member fixed to the cover member is brought into contact with the motor housing at its whole surface area for the purpose of increasing the mechanical strength, it is difficult to uniformly bring the cover member into contact with the motor housing at the whole surface area in view of processing accuracy and so on. As a result, noise may be generated by vibration or the like.

SUMMARY OF THE DISCLOSURE

The present disclosure is made in view of the above problems. It is an object of the present disclosure to provide a driving device, in which mechanical strength is increased in an axial direction of the driving device and noise generated by vibration or the like is reduced.

According to a feature of the present disclosure, a driving device is composed of a casing, an electric rotating machine, a control unit and a frame member.

The casing is formed in a cylindrical shape. The casing has a cylindrical wall portion, a bottom wall portion and a bearing holding portion formed in the bottom wall portion.

The electric rotating machine is composed of a stator, a shaft and a rotor. The stator is fixed to an inner surface of the casing. The shaft is rotatably supported by a bearing fixed to the bearing holding portion. The rotor is arranged inside of the casing and rotated together with the shaft.

The control unit is provided on a side of the bottom wall portion of the casing and controls operation of the electric rotating machine.

The frame member is provided between the control unit and the bottom wall portion of the casing, wherein the control unit is fixed to the frame member.

In the driving device of the present disclosure, at least one of a first contacting portion or a second contacting portion is provided. The first contacting portion is formed in the bottom wall portion and projected toward the frame member. A front-side surface of the first contacting portion is in contact with the frame member. The second contacting portion is formed in the frame member and projected toward the bottom wall portion. A front-side surface of the second contacting portion is in contact with the bottom wall portion.

In other words, in the case of the driving device formed with the first contacting portion, the casing is brought into contact with the frame member at the front-side surface formed at the first contacting portion. In the case of the driving device formed with the second contacting portion, the frame member is brought into contact with the casing at the front-side surface formed at the second contacting portion.

According to the above structure, a contacting area between the casing and the frame member is reduced. As a result, the noise generated by the vibration or the like can be reduced, when compared with a case in which the casing and the frame member are brought into contact with each other at its whole surface area. In addition, since it is possible to surely obtain sufficient surface pressure at the contacting surface area, the mechanical strength can be increased in the axial direction.

Furthermore, since the frame member, to which the control unit is fixed, and the casing are made of the independent parts from each other, it is possible to select appropriate material for each of the parts. For example, when the casing is made of soft magnetic material, such as iron, it is possible to reduce leakage of magnetic flux from the electric rotating machine. On the other hand, when the frame member is made of material having high thermal conductivity, such as aluminum, it is possible to effectively radiate heat generated in the control unit. Furthermore, when the frame member is made by aluminum die-casting method, it is possible to precisely assemble the frame member and the control unit to the casing. In addition, it is desirable to make the frame member from aluminum in view of weight saving. Furthermore, since the bearing holding portion is integrally formed with the bottom wall portion of the casing, it is possible to stably support the bearing.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION OF THE EMBODIMENTS

Figure 1:
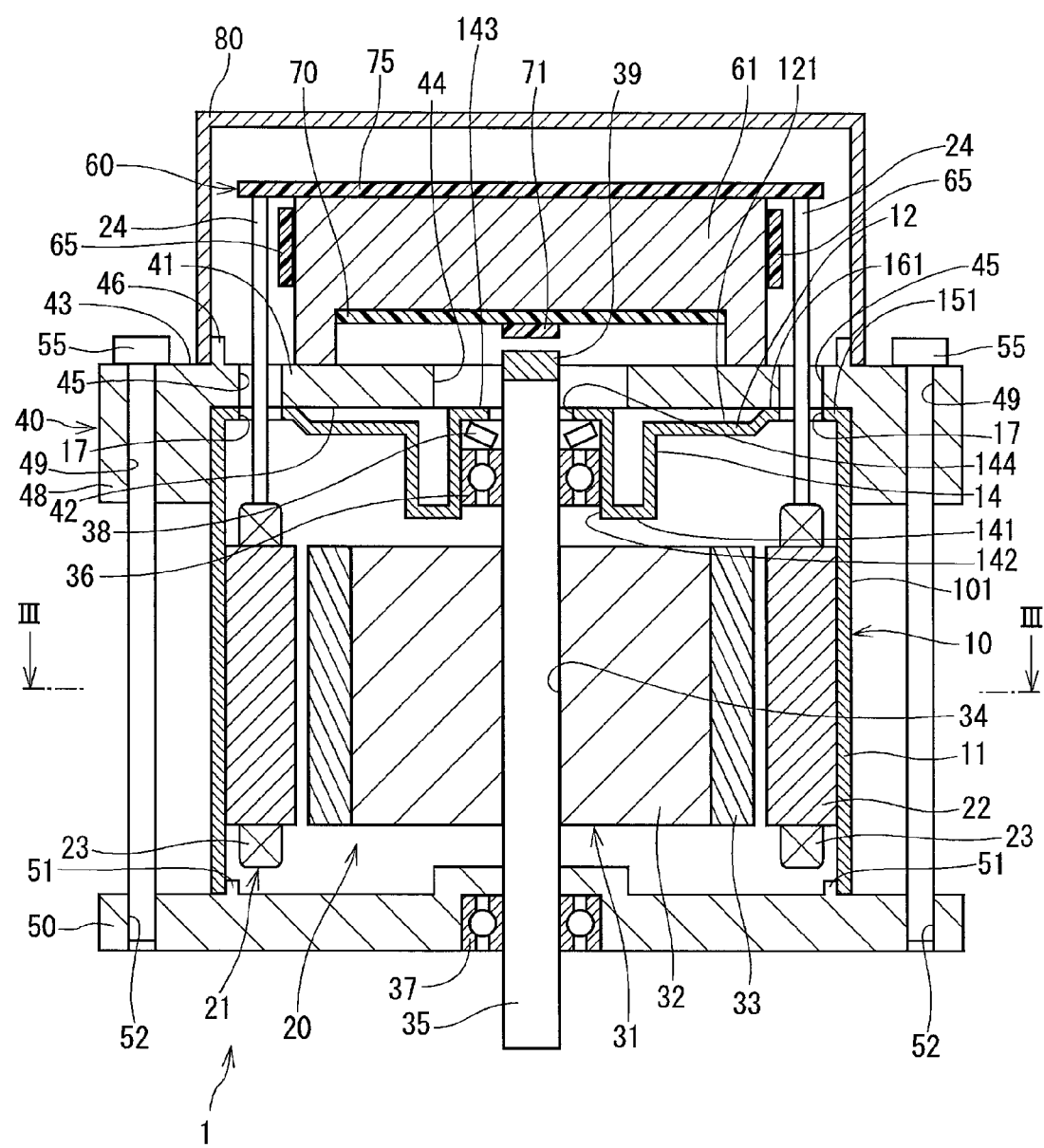
FIG. 1 is a schematic cross sectional view showing a motor driving device according to a first embodiment of the present disclosure.

The present disclosure will be explained hereinafter by way of multiple embodiments. The same reference numerals are given to the same or similar portions and/or structures throughout the embodiments, for the purpose of eliminating repeated explanation.

First Embodiment

A motor driving device 1 of a first embodiment of the present disclosure will be explained with reference to FIGS. 1 to 3. In FIG. 3, such portions behind a cross sectional surface are arbitrarily omitted.

The motor driving device 1 is, for example, installed in a vehicle and used for an electric power steering system, which assists a steering operation of a vehicle driver.

Figure 2:
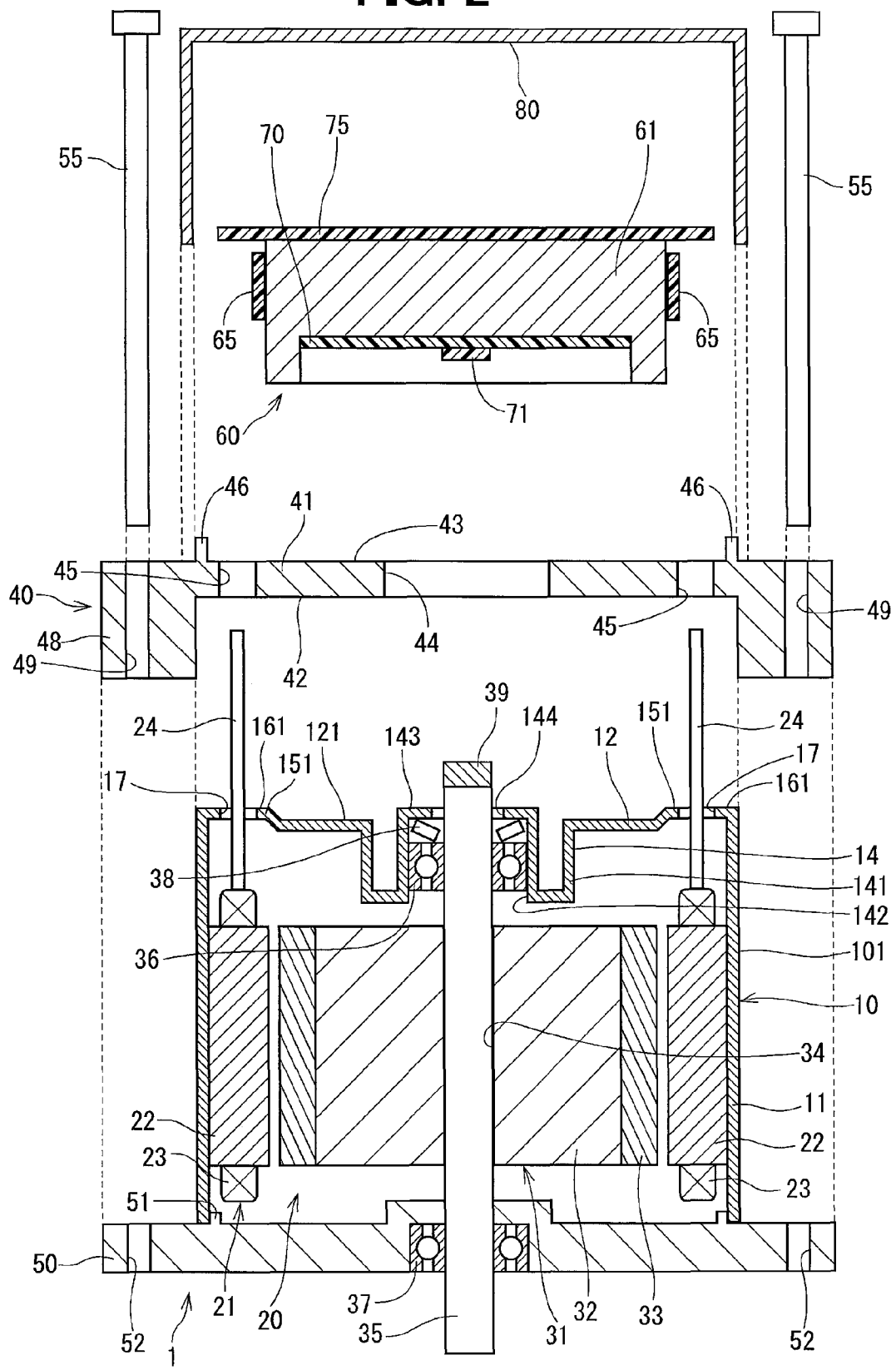
FIG. 2 is a schematically exploded cross sectional view showing the motor driving device of FIG. 1.
Figure 3:
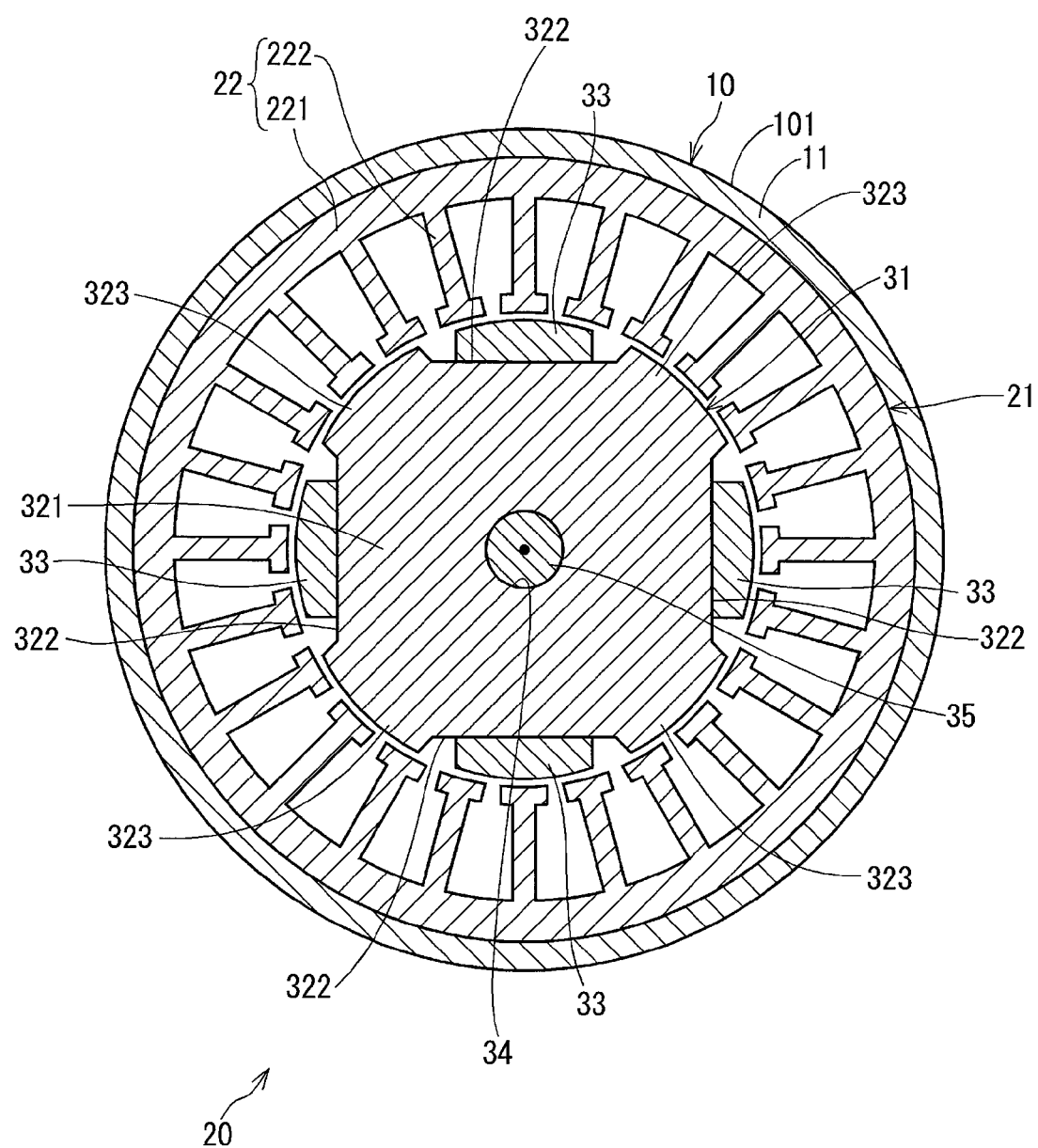
FIG. 3 is a schematic cross sectional view taken along a line III-III in FIG. 1.

As shown in FIGS. 1 and 2, the motor driving device 1 is composed of a motor casing 10 as a housing member, an electric motor 20 as an electric rotating machine, a first frame 40 as a frame member, a motor control unit 60 and so on.

The motor casing 10 is formed in a cylindrical shape having a cylindrical wall portion 11 and a bottom wall portion 12. In the present embodiment, the motor casing 10 is made of magnetic material, such as, iron or the like. The bottom wall portion 12 is a closed end side of the motor casing 10, which is also referred to as a control-unit side. An opposite side of the motor casing 10 to the bottom wall portion 12, that is, a lower end side in FIG. 1 or 2, is an open end. An outer surface of the bottom wall portion 12 is a bottom surface 121 facing to the motor control unit 60.

A bearing holding portion 14 is formed at a center of the bottom wall portion 12. The bearing holding portion 14 is composed of a recessed portion 141 and a washer holding portion 143. A bearing 36 is inserted into an inside space formed by an inner cylindrical wall 142 of the recessed portion 141. A shaft insertion through-hole 144 is formed at a center of the washer holding portion 143. The washer holding portion 143 is formed almost in an annular shape.

In the present embodiment, since the bearing holding portion 14 is integrally formed with the motor casing 10, the bearing holding portion 14 solidly supports the bearing 36.

A first contacting portion 151 is formed in the bottom wall portion 12. The first contacting portion 151 is projected in a direction toward the first frame 40. A front-side surface 161 of the first contacting portion 151 is in contact with the first frame 40. In the present embodiment, the first contacting portion 151 is formed in a continuous annular shape extending along an outer cylindrical wall 101 of the motor casing 10.

The electric motor 20 has a stator 21, a rotor 31 and a shaft 35. The electric motor 20 in the present embodiment is a three-phase brushless motor of an inner-rotor type. The stator 21 has a stator core 22 and windings 23.

The stator core 22 is made of multiple thin metal plates of magnetic material, wherein the multiple thin metal plates are laminated to one another in an axial direction of the electric motor 20. As shown in FIG. 3, the stator core 22 is composed of a yoke 221 fixed to an inner surface of the cylindrical wall portion 11 of the motor casing 10 and multiple teeth 222, each of which is projected from the yoke 221 in a radial-inward direction.

Referring back to FIGS. 1 and 2, the windings 23 are composed of U-phase windings, V-phase windings and W-phase windings, each of which is wound on each tooth 222 and accommodated in respective slots formed between the neighboring teeth 222. Each of U-phase, V-phase and W-phase windings 23 is connected to each lead wire 24. Each of the lead wires 24 passes through a lead-wire through-hole 17 formed in the bottom wall portion 12 of the motor casing 10. In FIG. 3, the windings 23 are omitted.

The rotor 31 has a rotor core 32 and multiple magnets 33. The rotor core 32 is made of thin metal sheets made of soft magnetic material, wherein the thin metal sheets are laminated in the axial direction of the electric motor 20. As shown in FIG. 3, the rotor core 32 is composed of a boss portion 321, magnet holding portions 322 and magnetic pole portions 323 of the soft magnetic material. The boss portion 321 is formed at a center of the rotor core 32. A shaft fixing through-hole 34 is formed in the boss portion 321.

Each of the magnet holding portions 322 and each of the magnetic pole portions 323 are formed at a radial-outward peripheral portion of the boss portion 321, wherein the magnet holding portions 322 and the magnetic pole portions 323 are alternately arranged in a circumferential direction of the rotor core 32. The magnet holding portion 322 is formed at a radial-outward position, which is more inside than a radial-outward position of the magnetic pole portion 323. In other words, each of the magnet holding portions 322 is recessed from the magnetic pole portion in a radial-inward direction.

Each of the magnets 33 is made of a permanent magnet, such as neodymium magnet or the like. Each of the magnets 33 is magnetized in a radial direction and fixed to the magnet holding portion 322 in such a way that the same magnetic pole is formed at each radial-outward side of the magnet 33.

For example, when the radial-outward side of the magnet 33 is magnetized as N-pole, magnetic flux from the N-pole of the magnet 33 goes into S-pole of the magnet 33 via the rotor core 32. In the present embodiment, since the rotor core 32 is made of the soft magnetic material, the magnetic flux passes from the radial-outward side into the radial-inward side at the magnetic pole portion 323. Therefore, when viewed the rotor 31 from its outside, the magnetic pole portion 323 can be regarded as S-pole. In a similar manner, when the radial-outward side of the magnet 33 is magnetized as S-pole, the magnetic pole portion 323 can be regarded as N-pole. As a result, in the present embodiment, the electric motor 20 can be regarded as an eight-pole motor because the electric motor 20 has four magnets 33 and four magnetic pole portions 323.

In the present embodiment, the magnets 33 correspond to "permanent magnet poles" and the magnetic pole portions 323 made of the soft magnetic material correspond to "soft magnetic-material poles". In the electric motor 20, the permanent magnet poles 33 and the soft magnetic-material poles 323 are alternately arranged in a rotational direction. Therefore, the electric motor 20 is a consequent-pole type motor. Since the permanent magnet poles 33 and the soft magnetic-material poles 323 are alternately arranged in order to form the magnetic poles of the rotor 31, it is possible to reduce amount of the magnets.

The shaft 35, which is made of metal and formed in a rod shape, is fixed to the shaft fixing through-hole 34 of the rotor 31. The shaft 35 is rotatably supported by the bearing 36 provided in the bearing holding portion 14 of the motor casing 10 and a bearing 37 provided in a second frame 50.

The bearings 36 and 37 are ball bearings in the present embodiment. A washer 38 is provided at the control-unit side of the bearing 36, that is, between the bearing 36 and the washer holding portion 143 of the motor casing 10. The washer 38 pushes the shaft 35 and the rotor 31 in the axial direction of the electric motor 20.

A magnet 39 is provided at an upper-side axial end of the shaft 35 on the control-unit side. A rotational position of the shaft 35, that is, the rotational position of the magnet 39 is detected by a position sensor 71.

The first frame 40 is made of material having high thermal conductivity, for example, aluminum. The first frame 40 is made by an aluminum die-casting process. The first frame 40 has a heat-sink fixing portion 41 and a cylindrical fitting portion 48. The heat-sink fixing portion 41 is formed at a center of the first frame 40 and formed in a disc shape. A lower side surface 42 of the heat-sink fixing portion 41 is a motor-side surface 42 opposing to the bottom wall portion 12 of the motor casing 10. An upper side surface 43 of the heat-sink fixing portion 41 is a control-unit side surface 43 facing to the motor control unit 60.

A shaft insertion through-hole 44 is formed at a center of the heat-sink fixing portion 41. The upper-side axial end of the shaft 35 is inserted through the shaft insertion through-hole 144 of the motor casing 10 and the magnet 39 is exposed to an outside of the motor casing 10 in the direction to the motor control unit 60.

Multiple lead-wire insertion through-holes 45 are formed in the heat-sink fixing portion 41 at such positions corresponding to the respective lead-wire through-holes 17 formed in the motor casing 10. Each of the lead wires 24 passes through the respective lead-wire through-holes 17 of the motor casing 10 and the lead-wire insertion through-holes 45 of the first frame 40 in the direction to the motor control unit 60.

The cylindrical fitting portion 48 is integrally formed with the heat-sink fixing portion 41 at its radial-outer periphery. The cylindrical fitting portion 48 is formed in such a shape corresponding to that of the motor casing 10 and fitted to the motor casing 10 on a side of the bottom wall portion 12.

Multiple bolt holes 49 are formed in the cylindrical fitting portion 48, wherein each of the bolt holes 49 penetrates through the cylindrical fitting portion 48 in the axial direction of the electric motor 20.

The motor-side surface 42 of the first frame 40 is opposed to the bottom wall portion 12 of the motor casing 10 and partly in contact with the bottom wall portion 12. More exactly, the motor-side surface 42 of the first frame 40 is in contact with the front-side surface 161 of the first contacting portion 151. In other words, the motor-side surface 42 of the first frame 40 and the bottom wall portion 12 of the motor casing 10 are not in contact with each other at any portions other than the front-side surface 161 of the first contacting portion 151.

The second frame 50 is made of, for example, aluminum and formed in a disc shape. The second frame 50 is provided at the open end of the motor casing 10 on the opposite side to the bottom wall portion 12. The bearing 37 is provided at a center of the second frame 50.

A fitting projection 51 is formed on a side of the second frame 50, that is, on an upper side of the second frame 50 opposing to the electric motor 20. The fitting projection 51 is inserted into and fitted to the motor casing 10. Multiple bolt holes 52 are formed in the second frame 50 at such positions corresponding to the bolt holes 49 of the first frame 40. Each of through-bolts 55 is inserted through the bolt holes 49 and 52 from the control-unit side, so as to interpose and firmly fix the motor casing 10 between the first and the second frames 40 and 50.

According to the above structure, the open end of the motor casing 10 is closed by the second frame 50. The shaft 35, which is fixed to and rotated together with the rotor 31, is rotatably supported by the bearing 36 provided at the bottom wall portion 12 of the motor casing 10 and the bearing 37 provided in the second frame 50. Accordingly, the shaft 35 as well as the rotor 31 is rotatable relative to the motor casing 10 and the stator 21 fixed to the motor casing 10.

The motor control unit 60 is provided on the side of the bottom wall portion 12 of the motor casing 10. The motor control unit 60 is coaxially arranged with the electric motor 20.

The motor control unit 60 is composed of a heat sink 61, semi-conductor modules 65, a control board 70, a power board 75 and so on. The motor control unit 60 includes various kinds of electric and electronic parts for controlling an operation of the electric motor 20.

The heat sink 61 is made of such material having high heat conductivity, such as, aluminum and fixed to the upper side surface 43 (the control-unit side surface) of the first frame 40 by screws or the like (not shown).

Each of the semi-conductor modules 65 includes switching elements for switching current supply to the respective three-phase windings 23. A wide surface portion of the semi-conductor module 65 is opposed to the heat sink 61. According to the above structure, heat generated at the switching elements is radiated to the heat sink 61.

The semi-conductor modules 65 are electrically connected to the control board 70 and the power board 75 via terminals and wires (not shown).

The control board 70 is fixed to a surface (a lower-side surface) of the heat sink 61 on a side to the electric motor 20 by screws or the like (not shown). Electric and electronic parts, such as a micro-computer, for controlling on-off switching operations of the switching elements formed in the semi-conductor modules 65 are mounted to the control board 70.

The position sensor 71 is provided at a side of the control board 70 on a side to the electric motor 20. The position sensor 71 is co-axially provided with the shaft 35 (including the magnet 39). The position sensor 71 is a rotational angle sensor having a magneto-resistance element for detecting change of the magnetic field of the magnet 39, which is rotated together with the shaft 35. Accordingly, the position sensor 71 detects the rotational angle of the rotor 31, that is, a rotational position of the electric motor 20. The rotational position of the electric motor 20 detected by the position sensor 71 is, for example, used for controlling the electric power supply to the windings 23.

The power board 75 is fixed to another surface (an upper-side surface) of the heat sink 61, which is on a side opposite to the electric motor 20, by screws or the like (not shown). Electric and/or electronic parts, such as, a capacitor (not shown), a choke coil (not shown) and so on, are mounted to the power board 75. The lead wires 24 are electrically connected to the power board 75. According to the above structure, the semi-conductor modules 65 are electrically connected to the windings 23 via the power board 75 and the lead wires 24. The on-off operations of the switching elements are controlled by the micro-computer and so on formed in the control board 70 so that the electric power supply to the windings 23 is controlled.

A cover member 80 is made of, for example, iron and formed in a cylindrical shape having a closed bottom end and an open end opening to the motor casing 10. The cover member 80 is fitted to a rib 46 formed at the upper side surface 43 of the first frame 40. According to the above structure, the motor control unit 60 is accommodated in a space formed between the bottom wall portion 12 of the motor casing 10 and the cover member 80.

An assembling process for the motor driving device 1 will be explained.

At first, the lower end of the shaft 35, to which the rotor 31 is fixed, is press-inserted into the bearing 37 provided in the second frame 50. Then, the motor casing 10, to which the stator 21 is fixed, is fitted to the second frame 50. In this step, the upper end of the shaft 35 is press-inserted into the bearing 36 provided in the motor casing 10. The first frame 40 is then fitted to the bottom wall portion 12 of the motor casing 10. The multiple through-bolts 55 are inserted through the respective bolt holes 49 of the first frame 40 and the respective bolt holes 52 of the second frame 50 in order to tightly fasten the first and the second frames 40 and 50 with each other, in a condition that the motor casing 10 is held between the first and the second frames 40 and 50. As above, since each of the components of the motor driving device 1 is built up in series to assemble them together, it is possible to easily and precisely assemble those components together.

Thereafter, the heat sink 61, to which the semi-conductor modules 65, the control board 70, the power board 75 and so on are fixed, is fixed to the first frame 40. Finally, the cover member 80 is fitted to the first frame 40.

Advantages of the motor driving device according to the present embodiment will be explained.

In the present embodiment, the permanent magnet poles 33 and the soft magnetic-material poles 323 are alternately arranged in the rotor 31 in order to form the magnetic poles for the rotor 31. When compared with a case in which all of the magnetic poles are formed by the permanent magnets, magnetic flux may easily leak to an outside of the electric motor 20 in the present embodiment. However, in the present embodiment, since the motor casing 10 is made of the soft magnetic material, such as iron, the motor casing 10 functions as a magnetic shield member and to thereby prevent or suppress the magnetic flux from leaking to the outside.

In the present embodiment, the motor control unit 60 is located on the axial side of the bottom wall portion 12 of the motor casing 10. In other words, the bottom wall portion 12 of the motor casing 10 is located between the electric motor 20 and the motor control unit 60. Since the bottom wall portion 12 functions as the magnetic shield in the direction to the motor control unit 60, it is possible to effectively prevent the magnetic flux from leaking to the side of the motor control unit 60.

In addition, in the present embodiment, the shaft insertion through-holes 44 and 144 are respectively formed in the first frame 40 and the motor casing 10. And the magnet 39 attached to the upper axial end of the shaft 35 (on the control-unit side) is outwardly protruded from the motor casing 10 and exposed to the outside in order that the magnet 39 is located at a position closer to the position sensor 71. According to the above structure, it is possible to increase detection accuracy by the position sensor 71 for the rotational position of the rotor 31. In particular, since the bottom wall portion 12 is located between the electric motor 20 and the motor control unit 60 and thereby the leakage of the magnetic flux toward the motor control unit 60 can be suppressed, robust performance is improved.

In addition, since the bearing holding portion 14 is integrally formed with the motor casing 10, the rigidity of the motor casing 10 is increased, while wear of the bearing holding portion 14 can be decreased.

As explained above, the motor casing 10 is made of the soft magnetic material in view of the magnetic shield. On the other hand, it is more preferable to make the part (the first frame 40), to which the motor control unit 60 is fixed, of the material having high heat conductivity (for example, aluminum) in view of processing accuracy and/or weight saving. In the present embodiment, therefore, the first frame 40 to which the motor control unit 60 is fixed is formed as an independent part from the motor casing 10 and the independent part (the first frame 40) is made of the material having high heat conductivity (for example, aluminum). According to the above structure, it is possible to effectively radiate the heat generated at the semi-conductor modules 65 via the heat sink 61, the first frame 40 and so on.

The first frame 40, to which the motor control unit 60 is fixed, is made by the aluminum die-casting process. When compared with a case in which the first frame 40 is made by a casting process, it is possible in the present embodiment to manufacture the first frame 40 with higher precision. Since the motor control unit 60 is assembled to the motor casing 10 by means of the first frame 40, it is possible to precisely arrange the motor control unit 60 at the position coaxial with the motor casing 10. As a result, the motor control unit 60 receives little influence of vibration caused by the rotation of the electric motor 20.

As explained above, the motor casing 10 and the first frame 40 are formed as independent parts from each other. It is, therefore, difficult to uniformly contact the bottom surface 121 of the motor casing 10 (on the side facing to the first frame 40) and the motor-side contacting surface 42 of the first frame 40 with each other in the whole contacting area thereof, when the first frame 40 is assembled to the motor casing 10. When the bottom surface 121 of the motor casing 10 and the contacting surface 42 of the first frame 40 are in contact with each other in a non-uniform manner, noise may be generated by the vibration of the motor driving device 1 and/or any other vibration (for example, vehicle vibration) applied to the motor driving device 1.

In the present embodiment, however, the first contacting portion 151 is formed in the bottom wall portion 12 of the motor casing 10 and the first frame 40 is brought into contact with the front-side surface 161 of the first contacting portion 151. In other words, the first frame 40 is in contact with the motor casing 10 at the front-side surface 161 of the first contacting portion 151. Further in the other words, the first frame 40 is not in contact with the bottom surface 121 of the motor casing 10 at any surfaces other than the front-side surface 161. As above, a contacting portion and a non-contacting portion are clearly distinguished from each other and a contacting area is made smaller to a limited value so as to decrease the noise caused by the vibration. In addition, since it is possible to ensure surface pressure at the contacting area, it is possible to make mechanical strength in the axial direction larger than a case of a spigot-joint structure, in which a flanged surface is used as a positioning portion. As a result, it is possible to prevent the first frame 40 from being deformed.

It is possible to decrease the noise more effectively when the contacting area between the bottom surface 121 of the motor casing 10 and the motor-side contacting surface 42 of the first frame 40 becomes smaller. On the other hand, it is possible to more effectively radiate the heat generated at the motor control unit 60 to the side of the motor casing 10, when the contacting area between the bottom surface 121 of the motor casing 10 and the motor-side contacting surface 42 of the first frame 40 becomes larger. Accordingly, it is possible to properly design the contacting area between the bottom surface 121 and the motor-side contacting surface 42 depending on a required radiating performance.

In the present embodiment, the washer holding portion 143 has a height (a length in the axial direction), which is almost equal to that of the first contacting portion 151. In other words, a level of an outer surface of the washer holding portion 143 is almost equal to that of the front-side surface 161 of the first contacting portion 151. Since the washer holding portion 143 is formed at a position corresponding to the shaft insertion through-hole 44 of the first frame 40, the washer holding portion 143 is not in contact with the first frame 40.

(1) As explained above, the motor driving device 1 of the first embodiment has the following features and advantages:

The motor driving device 1 is composed of the motor casing 10, the electric motor 20, the motor control unit 60 and the first frame 40.

The motor casing 10 has the cylindrical wall portion 11, the bottom wall portion 12 and the bearing holding portion 14 provided in the bottom wall portion 12. The motor casing 10 is formed in the cylindrical shape having the closed bottom end (that is, the bottom wall portion 12).

The electric motor 20 is composed of the stator 21, the shaft 35 and the rotor 31. The stator 21 is fixed to the inside of the motor casing 10. The shaft 35 is rotatably supported by the bearing 36 provided in the bearing holding portion 14. The rotor 31 is arranged inside of the motor casing 10 and rotated together with the shaft 35.

The motor control unit 60 is provided at the bottom wall portion 12 of the motor casing 10 for controlling the operation of the electric motor 20.

The first frame 40 is provided between the bottom wall portion 12 of the motor casing 10 and the motor control unit 60. The motor control unit 60 is fixed to the first frame 40.

The first contacting portion 151 is formed in the bottom wall portion 12, wherein the first contacting portion 151 is projected from the bottom wall portion 12 toward the first frame 40. The motor casing 10 is brought into contact with the first frame 40 at the front-side surface 161 of the first contacting portion 151.

According to the above structure, the contacting area between the motor casing 10 and the first frame 40 can be made smaller to the limited value. It is, thereby, possible to reduce the noise caused by the vibration more effectively than the case in which the motor casing and the first frame are in contact with each other in the whole surface. In addition, since it is possible to ensure the surface pressure, the mechanical strength in the axial direction can be increased.

Since the first frame 40 for holding the motor control unit 60 and the motor casing 10 are formed as the independent parts from each other, it is possible to select the most appropriate material for each part. For example, when the motor casing 10 is made of the soft magnetic material, it is possible to reduce the leakage of the magnetic flux from the electric motor 20. When the first frame 40 is made of the material having high heat conductivity (such as, aluminum), it is possible to effectively radiate the heat generated at the motor control unit 60. When the first frame 40 is manufactured by the aluminum die-casting process, it is possible to precisely assemble the motor control unit 60 to the motor casing 10. It is also desirable in view of the weight saving.

In addition, since the bearing holding portion 14 is integrally formed with the bottom wall portion 12 of the motor casing 10, it is possible to rigidly hold the bearing 36.

(2) The first contacting portion 151 is formed in the annular shape (extending in the circumferential direction in a continuous manner). When the first contacting portion 151 is formed in the annular shape, it is easier to make the front-side surface as the uniformly extending flat surface.

(3) The first contacting portion 151 is formed at the position along the outer periphery of the motor casing 10. It is possible to increase the rigidity of the motor casing 10 against external force applied to the motor casing in the radial direction thereof.

(4) The motor driving device 1 has the magnet 39 provided at the upper axial end of the shaft 35 on the side to the motor control unit 60. The motor control unit 60 is located at the position opposing to the magnet 39 and has the position sensor 71 for detecting the rotational position of the rotor 31.

Since the magnet 39 and the position sensor 71 are so arranged as to oppose to each other, it is possible to precisely detect the rotational position of the rotor 31. In particular, since the bottom wall portion 12 of the motor casing 10 is located on the side to the motor control unit 60, the robust character is improved by the leaked magnetic flux from the side of the electric motor 20. The motor casing 10 is preferably made of the soft magnetic material in view of the precise detection of the position sensor 71.

(5) In the rotor 31, the magnets 33 working as the permanent magnet poles and the magnetic pole portions 323 working as the soft magnetic-material poles are alternately arranged in the rotational direction. It is possible to reduce the amount of the permanent magnets, when compared with the case in which all of the magnetic poles are made of the permanent magnets. In addition, since the bottom wall portion 12 of the motor casing 10 is located between the electric motor 20 and the motor control unit 60, it is possible to reduce the leakage of the magnetic flux to the side of the motor control unit 60, when the motor casing 10 is made of the soft magnetic material, such as, iron.

Second Embodiment

A motor driving device 2 according to a second embodiment will be explained with reference to FIG. 4. A first contacting portion 152 of the second embodiment is different from that of the first embodiment. Such a different point will be mainly explained.

Figure 4:
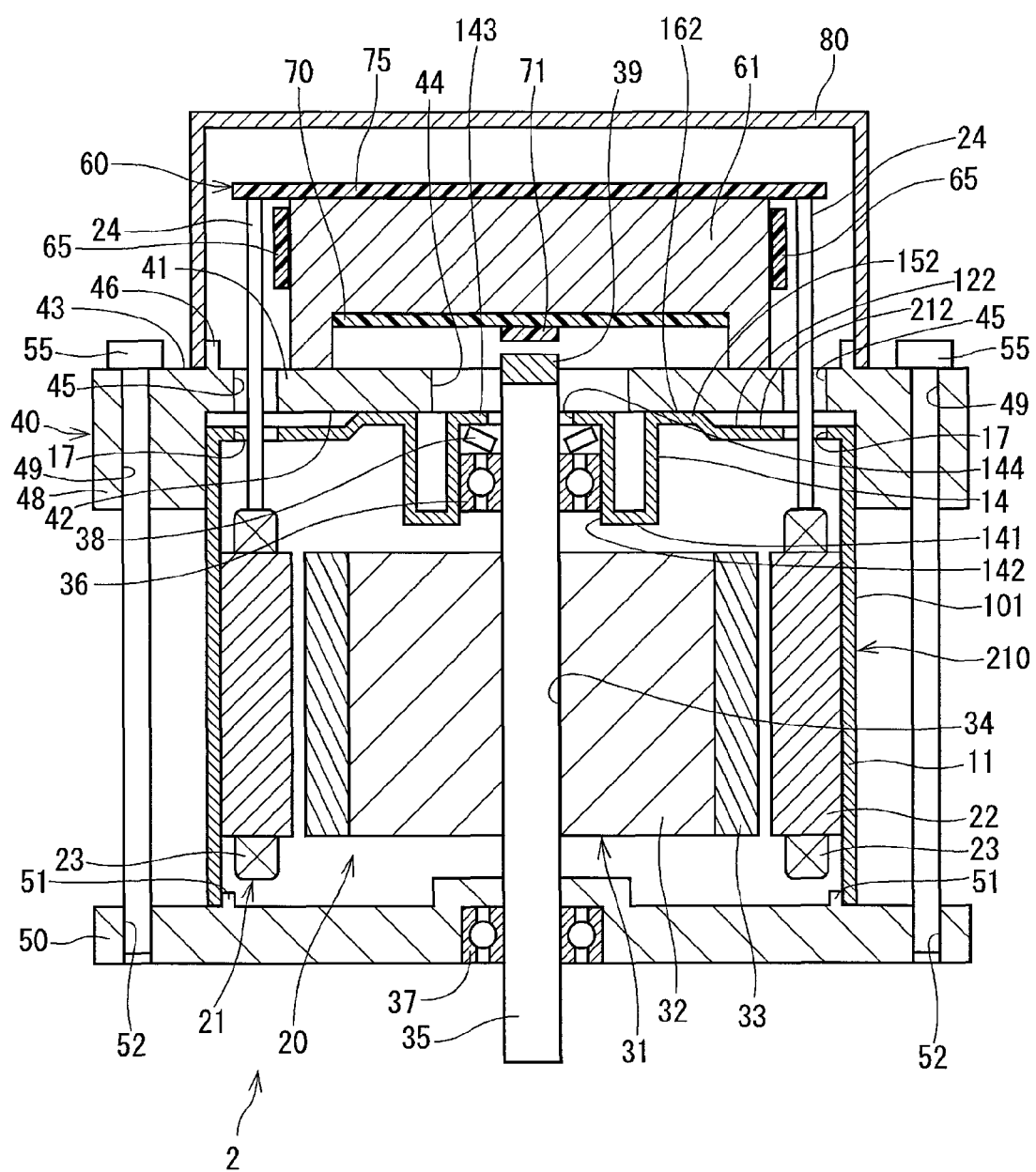
FIG. 4 is a schematic cross sectional view showing a motor driving device according to a second embodiment of the present disclosure.

As shown in FIG. 4, the first contacting portion 152 is formed in a bottom wall portion 212 of a motor casing 210. The first contacting portion 152 is projected from a bottom surface 122 of the bottom wall portion 212 in the direction to the first frame 40. The bottom surface 122 is a surface of the bottom wall portion 212 on the side to the motor control unit 60. A front-side surface 162 of the first contacting portion 152 is in contact with the first frame 40. The first contacting portion 152 is formed in a continuous annular shape extending along an outer periphery of the recessed portion 141, which forms the bearing holding portion 14.

The second embodiment has the same advantages to the above explained advantages (1), (2), (4) and (5) of the first embodiment.

In addition, since the first contacting portion 152 is so formed as to extend along the outer periphery of the bearing holding portion 14, the rigidity of the bearing holding portion 14 can be increased.

Third Embodiment

A motor driving device 3 according to a third embodiment will be explained with reference to FIGS. 5 and 6. A first contacting portion 153 of the third embodiment is different from that of the first embodiment. Such a different point will be mainly explained.

Figure 5:
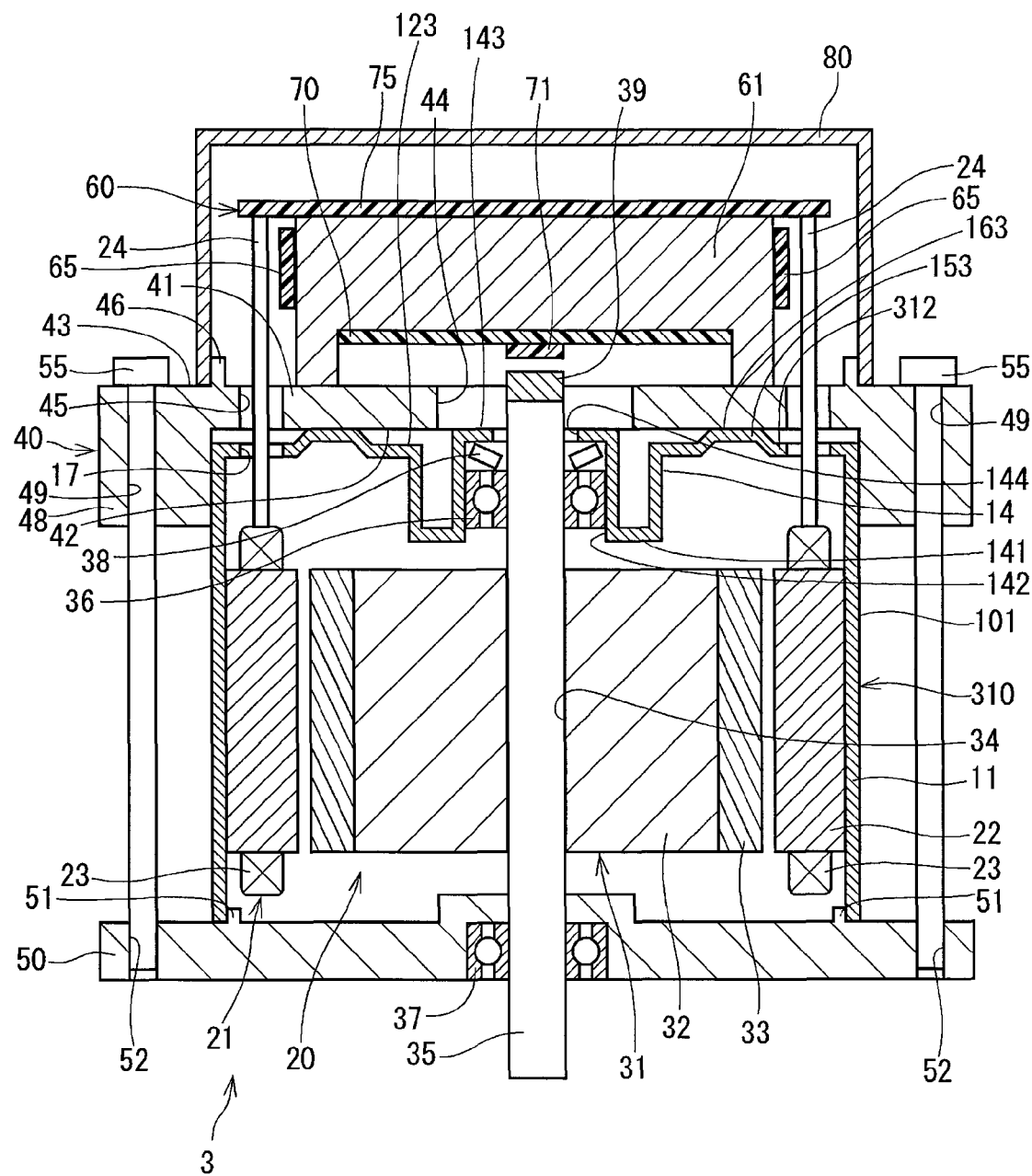
FIG. 5 is a schematic cross sectional view showing a motor driving device according to a third embodiment of the present disclosure.
Figure 6:
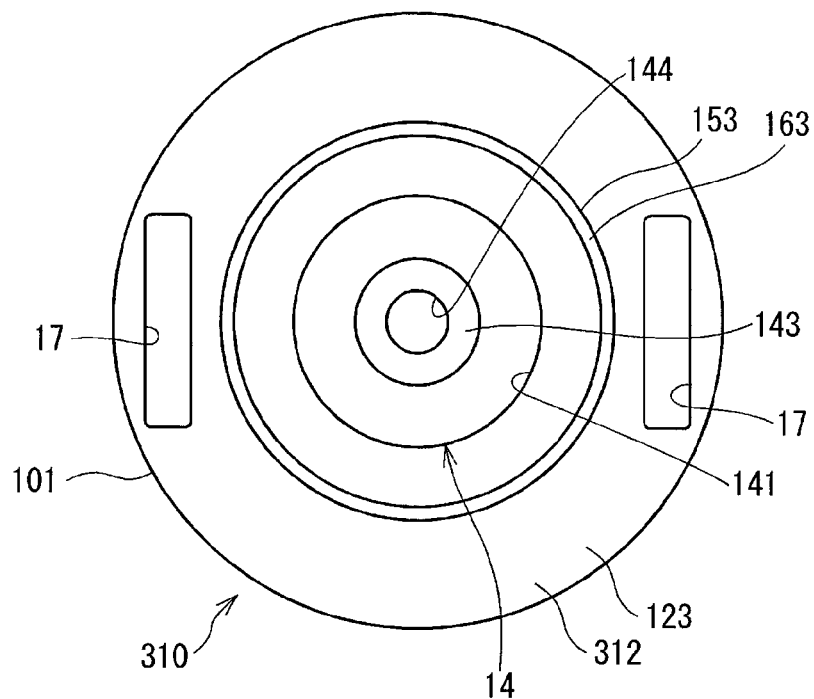
FIG. 6 is a schematic top plan view showing a motor casing according to the third embodiment.

As shown in FIG. 5, the first contacting portion 153 is formed in a bottom wall portion 312 of a motor casing 310. The first contacting portion 153 is projected from a bottom surface 123 of the bottom wall portion 312 in the direction to the first frame 40. The bottom surface 123 is a surface of the bottom wall portion 312 on the side to the motor control unit 60. A front-side surface 163 of the first contacting portion 153 is in contact with the first frame 40. The first contacting portion 153 is formed in a continuous annular shape in an annular area between the outer cylindrical wall 101 and the bearing holding portion 14.

The third embodiment has a following advantage (6) in addition to the above explained advantages (1), (2), (4) and (5) of the first embodiment:

(6) Since the first contacting portion 153 is formed in the annular area of the bottom wall portion 312 between the outer cylindrical wall 101 and the bearing holding portion 14, the rigidity of the bottom wall portion 312 of the motor casing 310 can be increased.

Fourth Embodiment

A motor driving device according to a fourth embodiment will be explained with reference to FIG. 7. The fourth embodiment is a modification of the third embodiment.

Figure 7:
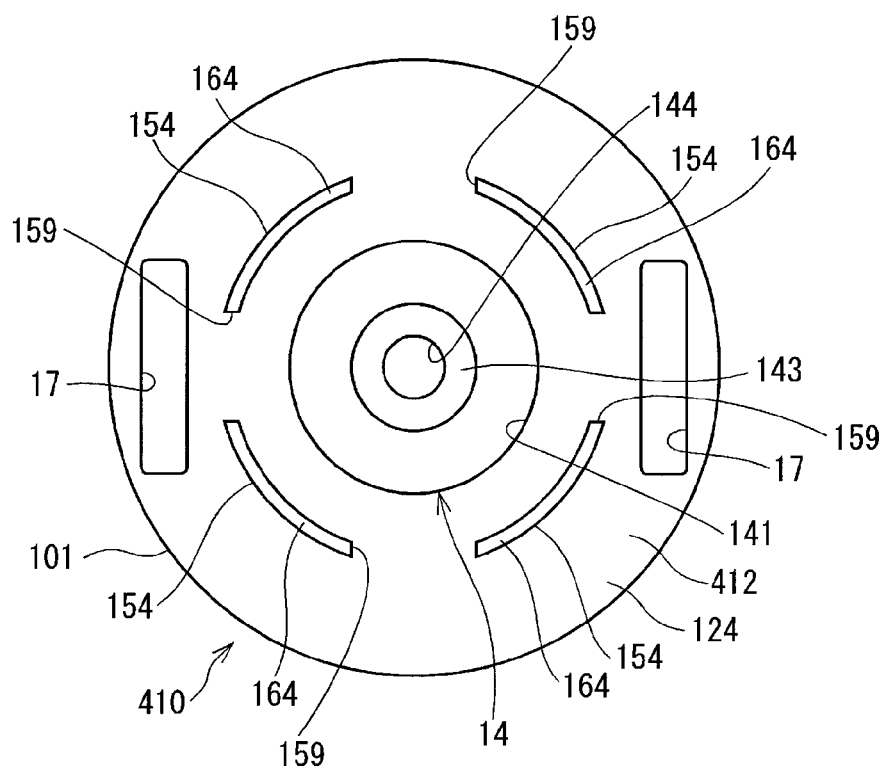
FIG. 7 is a schematic top plan view showing a motor casing according to a fourth embodiment.

As shown in FIG. 7, a first contacting portion 154 is composed of multiple (four) projections, each of which is formed in a bottom wall portion 412 of a motor casing 410. Each projection of the first contacting portion 154 is projected from a bottom surface 124 of the bottom wall portion 412 in the direction to the first frame 40. The bottom surface 124 is a surface of the bottom wall portion 412 on the side to the motor control unit 60. A front-side surface 164 of each projection of the first contacting portion 154 is in contact with the first frame 40.

Multiple notch portions 159 (four notch portions) are formed between the neighboring projections of the first contacting portion 154 in a circumferential direction. The first contacting portion 154 is formed in a discontinuous annular shape. In other words, each projection of the first contacting portion 154 is formed in an arc-shaped projection, when viewed in a direction parallel to the axial direction of the motor driving device.

In the fourth embodiment, the first contacting portion 154 of the discontinuous annular shape is formed in the annular area of the bottom wall portion 412 between the outer cylindrical wall 101 and the bearing holding portion 14. The first contacting portion 154 of the discontinuous annular shape may be formed at the outer cylindrical wall 101 like the first embodiment or at the outer periphery of the bearing holding portion 14 like the second embodiment.

The fourth embodiment has the same advantages to the above explained advantages (1), (4) and (5) of the first embodiment and the advantage (6) of the third embodiment.

Fifth Embodiment

A motor driving device according to a fifth embodiment will be explained with reference to FIG. 8.

Figure 8:
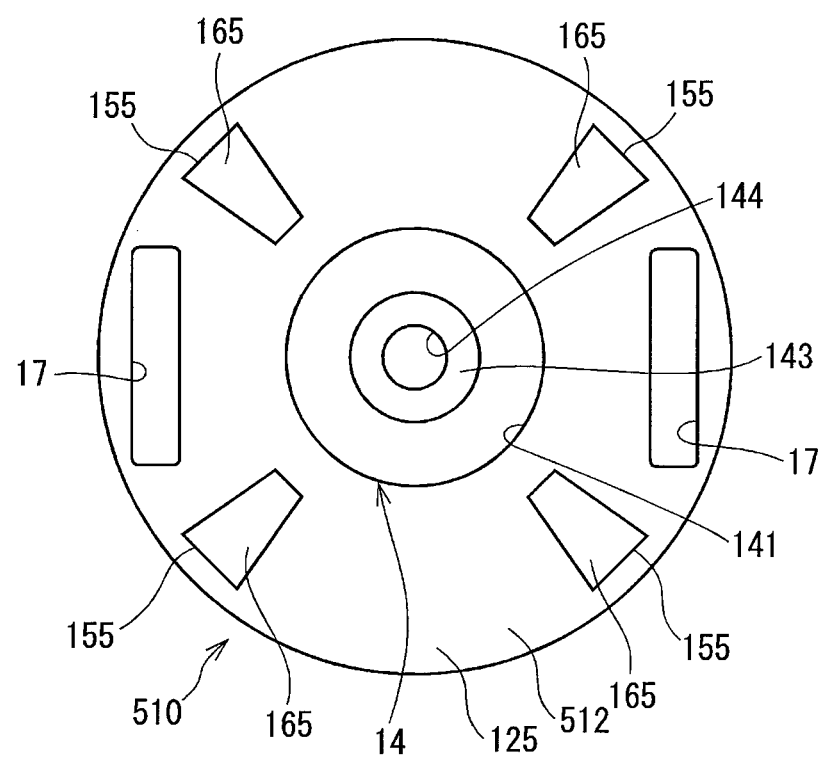
FIG. 8 is a schematic top plan view showing a motor casing according to a fifth embodiment.

As shown in FIG. 8, a first contacting portion 155 is composed of multiple projections, each of which is formed in a bottom wall portion 512 of a motor casing 510. Each projection of the first contacting portion 155 is projected from a bottom surface 125 of the bottom wall portion 512 in the direction to the first frame 40. The bottom surface 125 is a surface of the bottom wall portion 512 on the side to the motor control unit 60. A front-side surface 165 of each projection of the first contacting portion 155 is in contact with the first frame 40.

The multiple projections of the first contacting portion 155 are formed in the bottom wall portion 512 of the motor casing 510, wherein the multiple projections are arranged in a radial fashion and arranged at equal intervals between the neighboring projections in the circumferential direction. Each projection of the first contacting portion 155 is formed in a trapezoidal shape, when viewed in a direction parallel to the axial direction of the motor driving device.

The fifth embodiment also has the same advantages to the above explained advantages (1), (4) and (5) of the first embodiment.

In addition, since the multiple projections of the first contacting portion 155 are formed in the bottom wall portion 512 in the radial fashion, the rigidity of the bottom wall portion 512 of the motor casing 510 can be increased. As a result, it is possible to decrease the noises caused by resonant vibration and so on.

Sixth Embodiment

Figure 9:
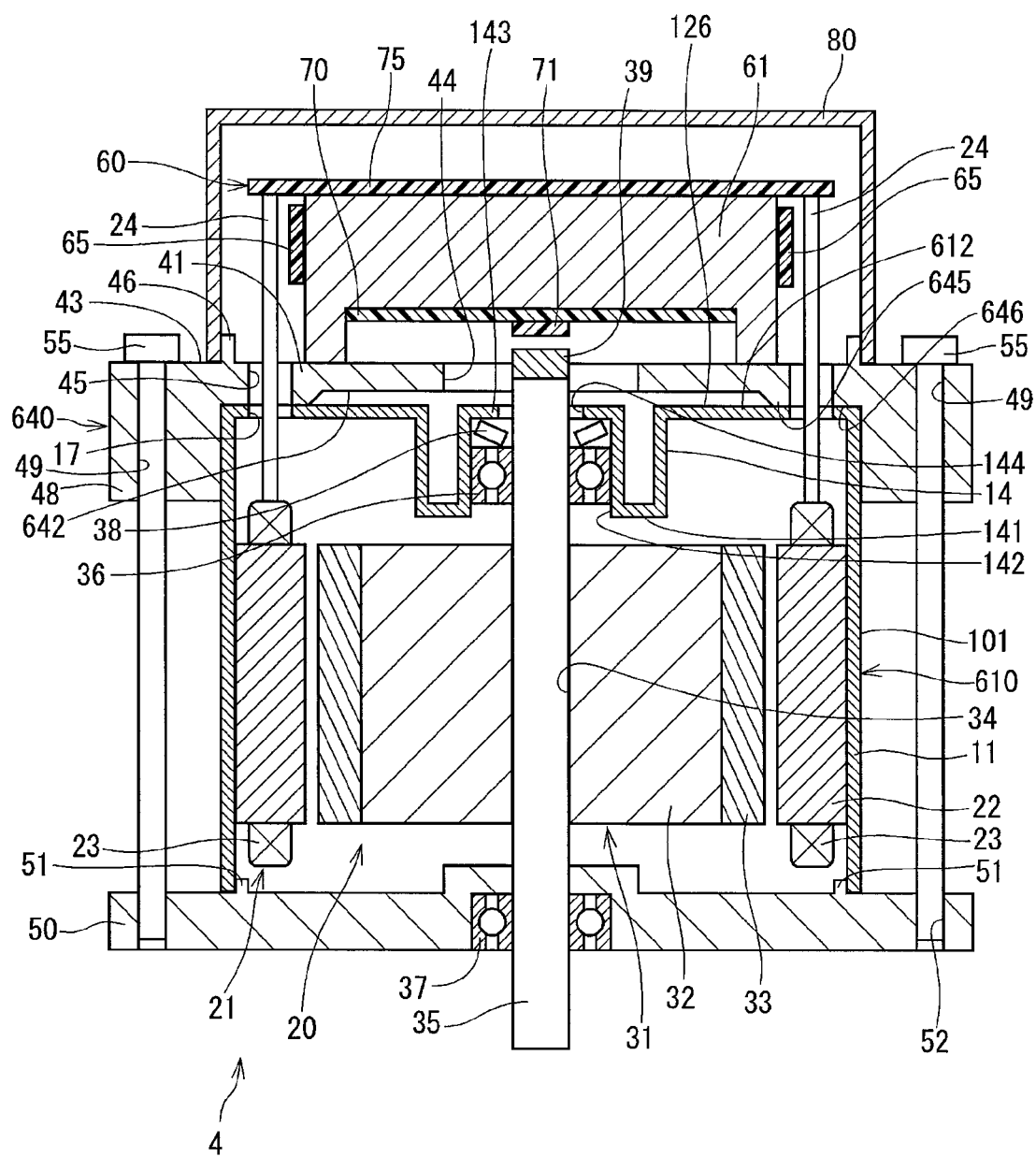
FIG. 9 is a schematic cross sectional view showing a motor driving device according to a sixth embodiment.

A motor driving device 4 according to a sixth embodiment will be explained with reference to FIG. 9.

In the motor driving device 4 of the sixth embodiment, a bottom wall portion 612 of a motor casing 610 does not have a structure corresponding to the first contacting portion 151 of the first embodiment. An outer bottom surface 126 of the bottom wall portion 612 is formed in an almost flat shape.

A second contacting portion 645 is formed on a motor-side surface 642 of a first frame 640, wherein the motor-side surface 642 is opposed to the bottom wall portion 612 of the motor casing 610. The second contacting portion 645 is projected from the motor-side surface 642 in a direction to the motor casing 610 and the first frame 640 is in contact with the motor casing 610 at a front-side surface 646 of the second contacting portion 645. The second contacting portion 645 is formed in a continuous annular shape at an inner periphery of the first frame 640 along the outer cylindrical wall 101 of the motor casing 610.

As above, according to the sixth embodiment, the second contacting portion 645 is formed in the first frame 640 projecting from the first frame 640 to the motor casing 610 and the first frame 640 is in contact with the motor casing 610 at the front-side surface 646 of the second contacting portion 645.

The sixth embodiment has a following advantage (7) in addition to the above explained advantages (1), (4) and (5) of the first embodiment.

(7) The second contacting portion 645 is formed in the continuous annular shape extending in its circumferential direction. It is, therefore, easier to process the first frame 640, for example, by a press work, so as to uniformly make the front-side surface 646 as the flat surface.

In addition, the second contacting portion 645 is formed at the position along the outer cylindrical wall 101 of the motor casing 610. As a result, the rigidity of the first frame 640 is increased at the portion formed with the second contacting portion 645.

Seventh Embodiment

A motor driving device 5 according to a seventh embodiment will be explained with reference to FIG. 10.

The seventh embodiment is a modification of the first embodiment, to which the sixth embodiment is combined. In the motor driving device 5 of the seventh embodiment, the second contacting portion 645 is formed in the first frame 640 in addition to the first contacting portion 151 formed in the bottom wall portion 12 of the motor casing 10.

In the seventh embodiment, the first and the second contacting portions 151 and 645 are opposed to each other in the axial direction of the motor driving device 5, so that the front-side surface 161 of the first contacting portion 151 and the front-side surface 646 of the second contacting portion 645 are in contact with each other. In other words, the motor casing 10 is in contact with the first frame 640 at the respective front-side surfaces 161 and 646.

As above, according to the seventh embodiment, the first contacting portion 151 is formed in the bottom wall portion 12 of the motor casing 10 and projected from the bottom wall portion 12 to the first frame 640. In addition, the second contacting portion 645 is formed in the first frame 640 and projected from the first frame 640 to the motor casing 10. The first frame 640 is in contact with the motor casing 10 at the front-side surface 161 of the first contacting portion 151 and the front-side surface 646 of the second contacting portion 645.

The seventh embodiment also has the same advantages to the above explained advantages (1) to (5) of the first embodiment and the advantage (7) of the sixth embodiment.

Eighth Embodiment

Figure 11:
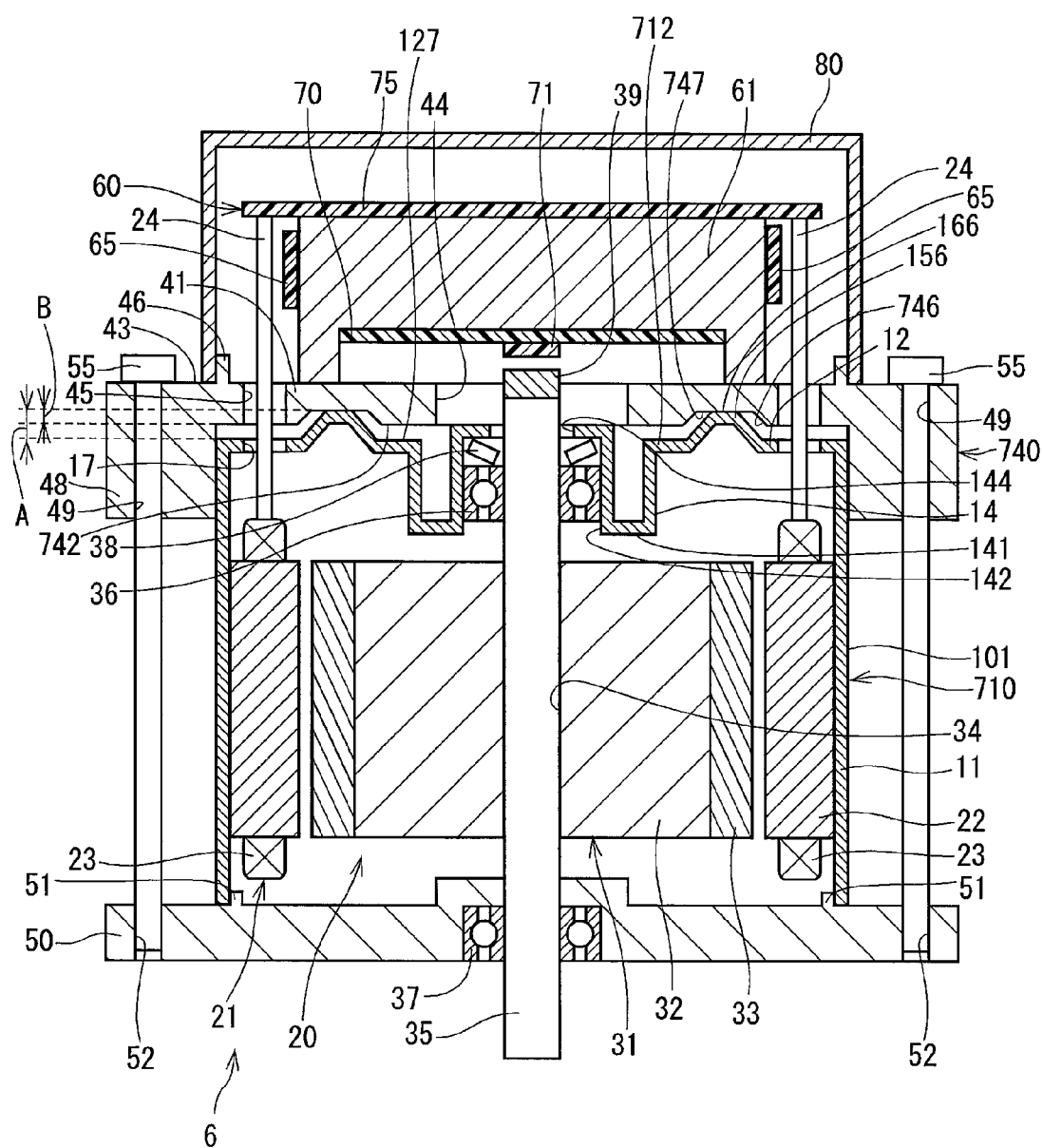
FIG. 11 is a schematic cross sectional view showing a motor driving device according to an eighth embodiment.

A motor driving device 6 according to an eighth embodiment will be explained with reference to FIG. 11. The eighth embodiment is a modification of the third embodiment (FIG. 5).

In the eighth embodiment, a first contacting portion 156 is formed in a bottom wall portion 712 of a motor casing 710. The first contacting portion 156 is projected from a bottom surface 127 of the bottom wall portion 712, which is on a side to the motor control unit 60, in a direction to a first frame 740. The first contacting portion 156 is formed in a continuous annular shape at an annular area between the bearing holding portion 14 and the outer cylindrical wall 101 of the motor casing 710.

An annular groove 746 is formed in a motor-side surface 742 of the first frame 740 at an annular area opposing to the first contacting portion 156. A front-side surface 166 of the first contacting portion 156 is in contact with a bottom surface 747 of the annular groove 746.

A height "A" of the first contacting portion 156 is preferably larger than a depth "B" of the annular groove 746, so that the first frame 740 is not in contact with the motor casing 710 at any other portions than the front-side surface 166 and the bottom surface 747 of the annular groove 746. A width of the annular groove 746 in the radial direction is larger than that of the first contacting portion 156. Furthermore, an inclination angle of the annular groove 746 is larger than that of the first contacting portion 156.

The eighth embodiment also has the same advantages to the above explained advantages (1), (2), (4) and (5) of the first embodiment and the advantage (6) of the third embodiment.

Further Embodiments and/or Modifications (M-1) In the above embodiments, the first contacting portion is formed in the continuous annular shape at the position along the outer cylindrical wall of the motor casing or at the position along the outer periphery of the bearing holding portion. Furthermore, the first contacting portion is formed in the continuous or discontinuous annular shape in the annular area of the bottom wall portion between the bearing holding portion and the outer cylindrical wall.

However, the position and/or the area for the first contacting portion are not limited to the above embodiments. The first contacting portion may be formed in the continuous or discontinuous annular shape at any portion and/or area of the bottom wall portion of the motor casing.

In the fourth embodiment (FIG. 7), the four notch portions 159 and the four projections 154 are formed to constitute the discontinuous annular shape for the first contacting portion 154. In the fifth embodiment (FIG. 8), the four projections (the first contacting portions 155) are formed in the radial fashion.

However, the number of the projections (the first contacting portions) is not limited to "four". The projections of any number other than "four" may be formed. The projection for the first contacting portion may be formed in any shape other than those of the fourth or fifth embodiment.

When multiple projections are formed for the first contacting portion, those projections are preferably formed in a symmetric shape. Furthermore, the above embodiments may be combined to each other in such a manner that multiple projections are formed in the discontinuous annular shape along the outer cylindrical wall while other multiple projections are formed in the discontinuous annular shape along the outer periphery of the bearing holding portion.

In any cases, the rigidity of the motor casing can be increased when the first contacting portion is formed in the bottom wall portion of the motor casing. Therefore, it is possible to form the first contacting portion at any position (or any area), for which the increase of the rigidity for the motor casing is desirable.

(M-2) In the sixth and seventh embodiments (FIGS. 9 and 10), the projection of the continuous annular shape is formed in the first frame for the second contacting portion. However, in a similar manner to the first contacting portion, the second contacting portion may be formed at any position (or any area) of the first frame, so long as the projection is formed in the motor-side surface of the first frame and the projection is in contact with the bottom wall portion of the motor casing. In addition, the second contacting portion may be formed by multiple projections, which are arranged in the discontinuous annular shape. Multiple projections may be further formed in the radial fashion. Multiple projections of any number and of any shape may be formed in the first frame.

In any cases, the rigidity of the first frame can be increased when the second contacting portion is formed in the first frame. Therefore, it is possible to form the second contacting portion at any position (or any area), for which the increase of the rigidity for the first frame is desirable.

(M-3) The motor-side surface of the first frame is made of the flat surface in the above first to third embodiments (FIGS. 1 to 5). However, the motor-side surface may be made of a surface having projections like the sixth and seventh embodiments (FIGS. 9 and 10), or made of a surface having an annular groove like the eighth embodiment (FIG. 11).

Figure 10:
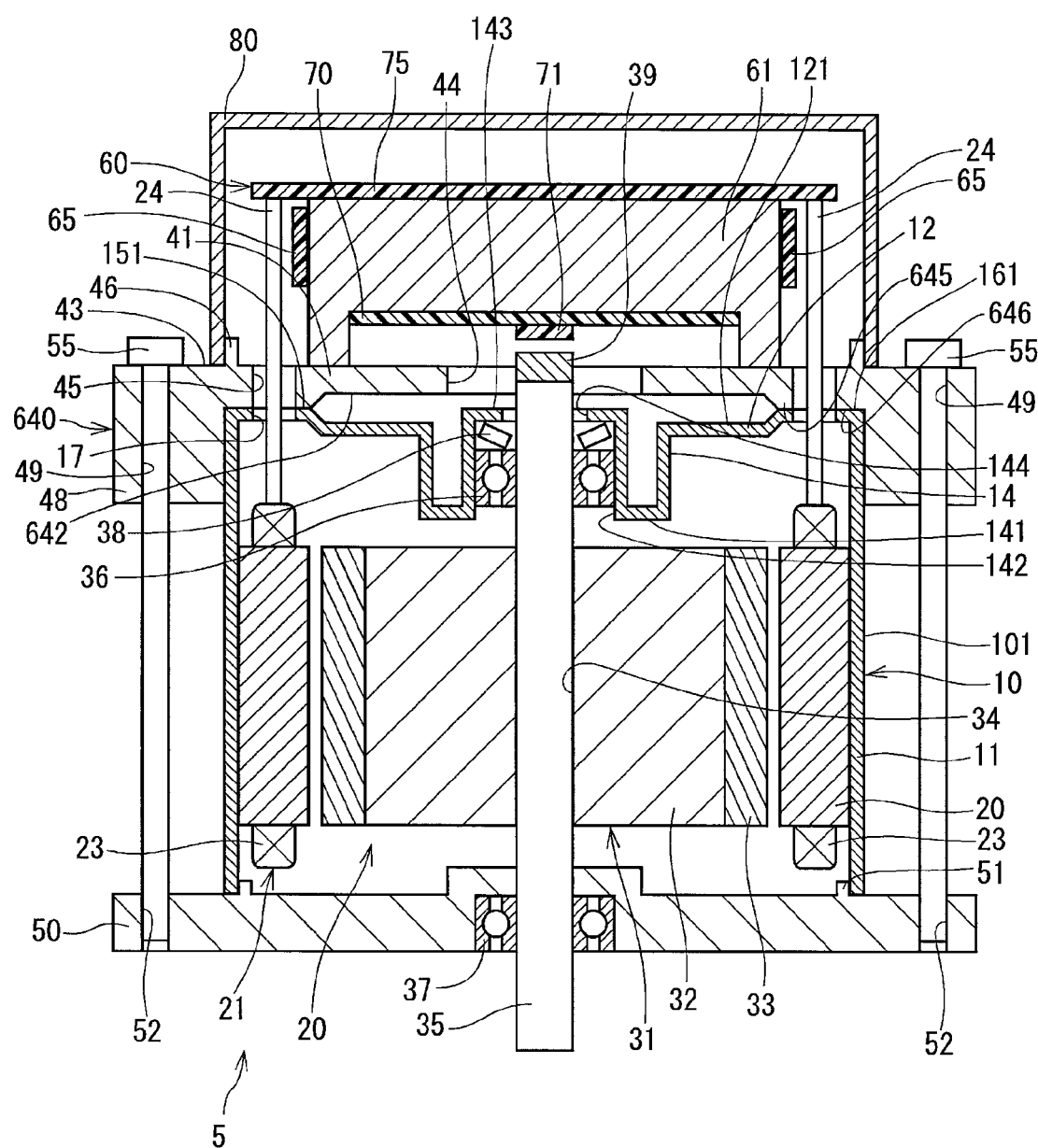
FIG. 10 is a schematic cross sectional view showing a motor driving device according to a seventh embodiment.

(M-4) The front-side surface of the bottom wall portion of the motor casing, which is in contact with the second contacting portion of the first frame, is made of the flat surface in the sixth embodiment (FIG. 9) or the surface having the projection in the seventh embodiment (FIG. 10). However, the front-side surface of the bottom wall portion may be made of a surface having a recessed portion or an annular groove.

(M-5) In the above embodiments, the motor casing is made of iron, while the first frame is made of aluminum by the aluminum die-casting process. Any other material or any other manufacturing process may be used for or applied to the motor casing and the first frame.

(M-6) In the above embodiments, the semi-conductor modules of the motor control unit are arranged along the heat sink and electrically connected to the lead wires via the power board. The semi-conductor modules may be directly connected to the lead wires without passing through the power board. In addition, the semi-conductor modules may be mounted to the control board or the power board. Furthermore, a number of the boards is not limited to "two". The number of boards may be "one" or more than "two".

(M-7) In the above embodiments, the object to be detected by the position sensor is the permanent magnet and the position sensor is composed of the magneto-resistive element for detecting the change of the magnetic field. The position sensor may be composed of a resolver. In such a case, the object to be detected by the resolver is a coil. As above, the object to be detected may be changed depending on the type of the position sensor.

(M-8) In the above embodiments, the electric motor is the consequent-pole type motor, according to which the permanent magnet poles and the soft magnetic-material poles are alternately arranged in the rotational direction.

Figure 12:
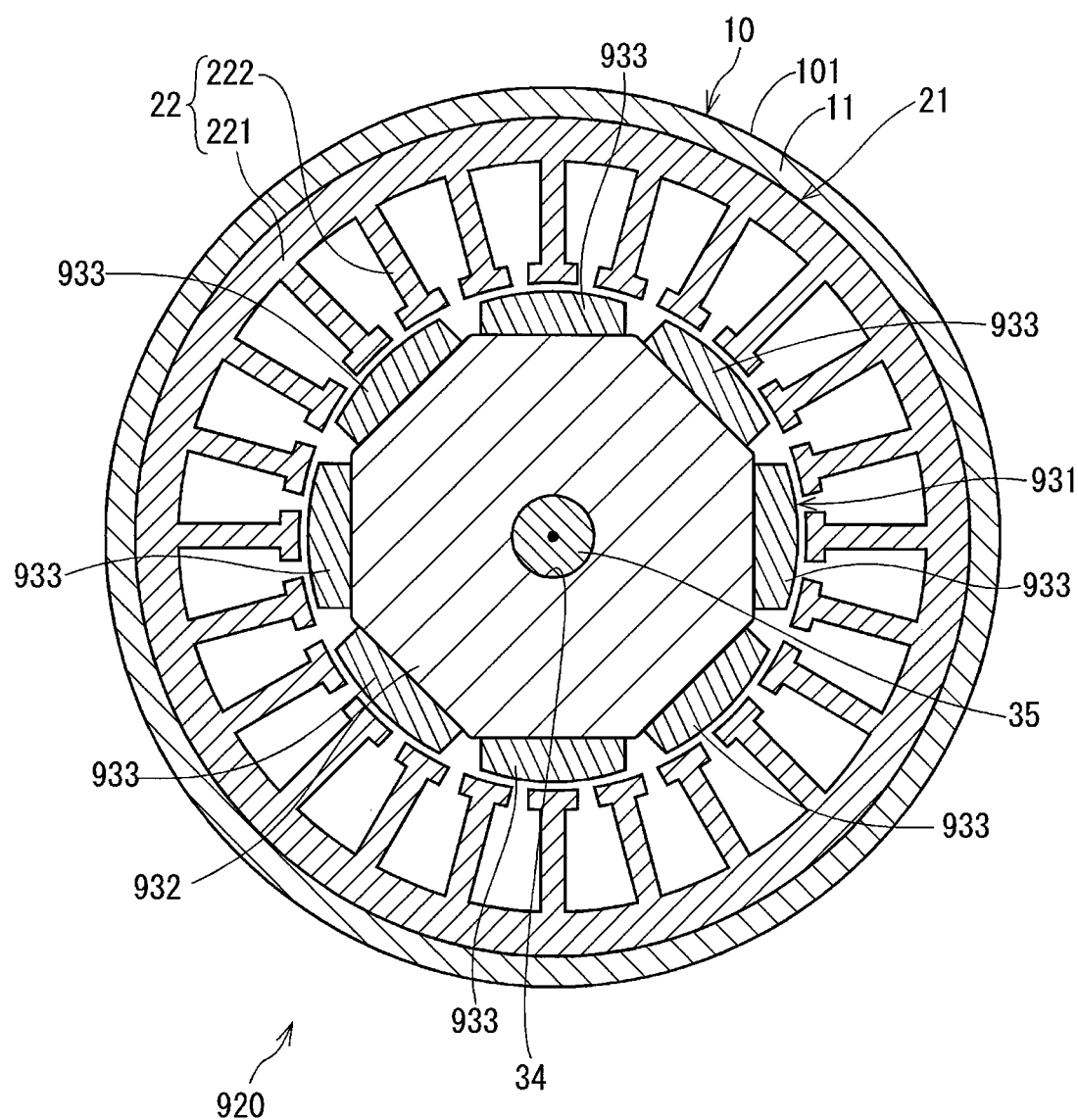
FIG. 12 is a schematic cross sectional view showing a motor driving device according to a further embodiment.

The electric motor may be modified in such a way as shown in FIG. 12. As shown in FIG. 12, in an electric motor 920, multiple magnetic poles are formed at radial outer portions of a rotor core 932 of a rotor 931, so that N-poles and S-poles are alternately formed in the rotational direction. In FIG. 12, all of the magnetic poles are made of permanent magnets 933. FIG. 12 corresponds to a cross sectional view taken along the line III-III in FIG. 1.

In addition, the permanent magnet is not limited to the neodymium magnet but any other types of the magnets may be used.

The number of the magnetic poles of the rotor and the number of the slots are not limited to those of the above embodiments. The stator winding may be formed in any kinds of the windings, such as a full pitch winding, a short pitch winding, a wave winding, a lap winding and so on.

In addition, the rotational machine is not limited to the electric motor, but may be composed of a generator or a motor generator having both functions of the electric motor and the generator.

In the above embodiments, the driving device is applied to the electric power steering apparatus for the automotive vehicle. The driving device may be used for any other devices, for example, a vehicle accessory device or a vehicle main device. In addition, the driving device may be used for industrial equipment, consumer electrical devices and so on.

The present disclosure is not limited to the above embodiments and/or modifications but can be further modified in various manners without departing from spirits of the present disclosure.

What is claimed is:

1. A driving device comprising:
   a casing formed in a cylindrical shape, the casing having a cylindrical wall portion, a bottom wall portion and a bearing holding portion formed in the bottom wall portion;
   an electric rotating machine having a stator fixed to an inner surface of the casing, a shaft rotatably supported by a bearing fixed to the bearing holding portion, and a rotor arranged inside of the casing and rotated together with the shaft;
   a control unit provided on a side of the bottom wall portion of the casing and controlling operation of the electric rotating machine; and
   a frame member provided between the control unit and the bottom wall portion of the casing, the control unit being fixed to the frame member,
   wherein the bottom wall portion is composed of:
      a first flat plate portion connected to the bearing holding portion and extending in a radial-outward direction; and
      a second flat plate portion connected to the first plate portion and extending in a radial-outward direction perpendicular to an axial direction of the cylindrical wall portion,
   wherein a first contacting portion is formed in the second flat plate portion of the bottom wall portion so as to be projected toward the frame member and a front-side surface of the first contacting portion is in contact with the frame member.

2. The driving device according to claim 1, wherein the first contacting portion is formed in a continuous annular shape, wherein the contacting portion continuously extends in a circumferential direction of the driving device.

3. The driving device according to claim 2, wherein the first contacting portion is formed at a position along an outer cylindrical wall of the cylindrical wall portion.

4. The driving device according to claim 2, wherein the first contacting portion is formed at a position along an outer periphery of the bearing holding portion.

5. The driving device according to claim 2, wherein the first contacting portion is formed at an annular area of the bottom wall portion between the bearing holding portion and an outer cylindrical wall of the cylindrical wall portion.

6. The driving device according to claim 1, wherein the first contacting portion is composed of multiple projections, which are arranged in a discontinuous annular shape, wherein the contacting portion discontinuously extends in a circumferential direction of the driving device.

7. The driving device according to claim 1, wherein the first contacting portion is composed of multiple projections, which are arranged in a radial fashion.

8. The driving device according to claim 1, further comprising:
   an object to be detected, which is fixed to an axial end of the shaft on a side to the control unit; and
   a position sensor provided in the control unit at a position opposing to the object to be detected, the position sensor detecting a rotational position of the rotor.

9. The driving device according to claim 1, wherein multiple permanent magnet poles and multiple soft magnetic-material poles are alternately arranged at an outer periphery of the rotor in a rotating direction of the rotor.

10. A driving device comprising:
a casing formed in a cylindrical shape, the casing having a cylindrical wall portion, a bottom wall portion extending in a direction perpendicular to an axial direction of the cylindrical wall portion and a bearing holding portion formed in the bottom wall portion;
an electric rotating machine having a stator fixed to an inner surface of the casing, a shaft rotatably supported by a bearing fixed to the bearing holding portion, and a rotor arranged inside of the casing and rotated together with the shaft;
a control unit provided on a side of the bottom wall portion of the casing and controlling operation of the electric rotating machine; and
a frame member provided between the control unit and the bottom wall portion of the casing, the control unit being fixed to the frame member,
wherein a second contacting portion is formed in the frame member so as to be projected toward the bottom wall portion and a front-side surface of the second contacting portion, which extends in the direction perpendicular to the axial direction of the cylindrical wall portion, is in contact with the bottom wall portion in a surface-to-surface manner in the axial direction.

11. The driving device according to claim 10, wherein the second contacting portion is formed in a continuous annular shape, wherein the contacting portion continuously extends in a circumferential direction of the driving device.

12. The driving device according to claim 11, wherein the second contacting portion is formed at a position along an outer cylindrical wall of the cylindrical wall portion.

13. The driving device according to claim 11, wherein the second contacting portion is formed at a position along an outer periphery of the bearing holding portion.

14. The driving device according to claim 11, wherein the second contacting portion is formed at an annular area of the bottom wall portion between the bearing holding portion and an outer cylindrical wall of the cylindrical wall portion.

15. The driving device according to claim 10, wherein the second contacting portion is composed of multiple projections, which are arranged in a discontinuous annular shape, wherein the contacting portion discontinuously extends in a circumferential direction of the driving device.

16. The driving device according to claim 10, wherein the second contacting portion is composed of multiple projections, which are arranged in a radial fashion.

17. The driving device according to claim 10, further comprising:
an object to be detected, which is fixed to an axial end of the shaft on a side to the control unit; and
a position sensor provided in the control unit at a position opposing to the object to be detected, the position sensor detecting a rotational position of the rotor.

18. The driving device according to claim 10, wherein multiple permanent magnet poles and multiple soft magnetic-material poles are alternately arranged at an outer periphery of the rotor in a rotating direction of the rotor.

19. A driving device comprising:
a casing made of soft magnetic material and formed in a cylindrical shape, the casing having a cylindrical wall portion, a bottom wall portion a bearing holding portion formed in the bottom wall portion, and an open end opposite to the bottom wall portion;
an electric rotating machine having a stator fixed to an inner surface of the casing, a shaft rotatably supported by a bearing fixed to the bearing holding portion, and a rotor arranged inside of the casing and rotated together with the shaft;
a control unit provided on a side of the bottom wall portion of the casing and controlling operation of the electric rotating machine;
a first frame member made of material having high heat conductivity and provided between the control unit and the bottom wall portion of the casing, the control unit being fixed to the first frame member; and
a second frame member provided at the open end of the casing so that the casing is interposed between the first and the second frame members,
wherein a first contacting portion is formed in the bottom wall portion so as to be projected toward the first frame member and a front-side surface of the first contacting portion is in contact with the first frame member, and/or a second contacting portion is formed in the first frame member so as to be projected toward the bottom wall portion and a front-side surface of the second contacting portion is in contact with the bottom wall portion.

* * * * *